Patented May 29, 1951

2,554,944

UNITED STATES PATENT OFFICE 2,554,944

FIXATIVE FOR PREPARING HISTOLOGIC TISSUES

Andres Ferrari, Jr., Uniondale, N. Y., assignor, by mesne assignments, to Technicon Chemical Company, Inc., New York, N. Y., a corporation of New York No Drawing. Application January 7, 1950, Serial No. 137,489

5 Claims. (Cl. 8—94.11)

This invention relates to fixatives for preparing human or other animal tissue for microscopic examination.

One type of fixative which has been used by pathologists for a great many years is known as Zenker's solution, which is a solution of potassium dichromate, $K_2Cr_2O_7$, and mercuric chloride, $HgCl_2$, in water. Zenker's original formula called for the use of a saturated solution of mercuric chloride and 2.5 to 5 percent of potassium dichromate.

Certain changes in Zenker's original formula have been proposed heretofore; for example, Zenker suggested the addition of 5% of acetic acid to the solution and later Helly suggested that up to 5% of a formaldehyde solution (a 40% formaldehyde solution) be used instead of acetic acid, the purpose of the added ingredient, i. e., acetic acid or formaldehyde being to decrease the shrinkage and distortion of the tissue. However, the results have not been even remotely as good as desired, especially because considerable shrinkage and distortion of the tissue take place even when acetic acid or formaldehyde is used. Moreover, when either of these last mentioned reagents is used, it is necessary to add it to the solution immediately prior to use of the latter, because said reagents disrupt the chemical stability of the solution. Also, as is well known to pathologists and technicians, tissue which has been fixed by Zenker's solution requires considerable washing. Furthermore, if tissue is allowed to remain in Zenker's solution too long, say 24 hours or more, the tissue becomes hardened and even brittle. Another disadvantage of using acetic acid is that in some cases the red cells are laked (lysis).

The primary object of the present invention is to provide a mercuric chloride-potassium dichromate (Zenker's type) fixative which eliminates or greatly reduces the above mentioned and other disadvantages of the Zenker's type of fixative, as heretofore known, and to provide a fixative of this general type which is chemically stable and capable of standardization.

Another object is to provide a preparation comprising all of the fixative ingredients in a mixture in the solid phase so that the fixative solution may be prepared merely by dissolving the mixture in water. Thus, the fixative preparation may be conveniently and advantageously put up and sold in the form of a powder and thereafter dissolved in water for preparing the fixative solution quickly and conveniently and as needed by the pathologist.

The invention and the above mentioned and other objects thereof will be fully explained or will be apparent as the description proceeds.

I have discovered that greatly improved results are obtained by incorporating urea in the composition. In accordance with the present invention, briefly described, the relative proportions of potassium dichromate and mercuric chloride per 1000 mls. of the fixative solution are preferably such that the molar concentrations of potassium dichromate and mercuric chloride are considerably less than the corresponding concentrations in the Zenker's formula as ordinarily employed, the substances, namely acetic acid and formaldehyde, heretofore proposed by Zenker and Helly, respectively, to counteract shrinkage and distortion of the tissue are omitted. The primary function of the urea as an ingredient of the composition is to aid in preventing shrinkage and distortion of the tissue and to act as a swelling agent so as to accelerate the penetration of the solution into the tissue and to eliminate zonal fixation which was heretofore frequently encountered and which retarded the penetration of the fixative into the inner portions of the tissue. Further, as urea is neutral in respect to mercuric chloride and potassium dichromate disturbance of the chemical stability of these substances or precipitation in the solution is obviated, thus eliminating the objections and disadvantages of acetic acid and formaldehyde. Moreover, urea is a denaturant and contributes to the fixing of the tissue.

All of the above mentioned ingredients, namely potassium dichromate, mercuric chloride, and urea, are preferably in powder form and are mixed together forming a fixative composition in the solid phase. This composite powder mixture facilitates packaging and also facilitates the preparation of the fixative solution, it being merely necessary to dissolve the fixative powder in water.

The ingredients are mixed together preferably in relative proportions of about 6 parts of potassium dichromate, about 17 parts of mercuric chloride, and about 15 parts of urea in a powder mixture of said ingredients in the solid phase. Accordingly, the powder mixture may be put up and sold in a form convenient both to the manufacturer and the laboratory, and can be easily and conveniently used for preparing the fixative solution in the laboratory as needed.

The following is a preferred example of the composition of the fixative powder for 1000 mls. of fixative solution:

| | Grams |
|---|---|
| Potassium dichromate | 12.2582 |
| Mercuric chloride | 33.94 |
| Urea | 30.03 |

In preparing the fixative solution, the powder of the above composition is dissolved in sufficient distilled water to make 1000 mls. The quantity of potassium dichromate, mercuric chloride and urea in the above example, represent 0.04067, 0.1250, and 0.50 molar concentrations of these substances respectively in the solution. The above example represents a composition found to give excellent results, the time of treatment being four and one-half hours.

It will be understood that while the relative proportions of the ingredients of the composition are preferably uniform, the quantities thereof per 1000 mls. of the solution, and hence the molar concentrations although of the same ratio, may vary especially if the period of treatment is increased when the molar concentrations are decreased. Thus, for example the quantities of the several ingredients may be decreased as indicated by the following example, for 1000 mls. of solution, the time of treatment of the tissue being increased if necessary:

| | Grams |
|---|---|
| Potassium dichromate | 6.1291 |
| Mercuric chloride | 16.97 |
| Urea | 15.015 |

When the above composition (second example) is dissolved in a quantity of water sufficient to make 1000 mls. of fixative solution, the molar concentrations of potassium dichromate, mercuric chloride and urea are 0.020335, 0.0625, and 0.25, respectively.

The tissue treated with the fixative of the present invention requires very little, if any, washing; in contrast to the thorough washing required with the higher concentrations of the Zenker's fixative, as heretofore used. Thus, tissue fixed with the composition of the present invention may be immediately subjected to the dehydration process without intermediate washing, although if desired the tissue may be rinsed quickly in water before immersing it in the dehydrant.

The processing of the tissue, following the fixing thereof, i. e., the dehydration of the tissue and staining of the slides is preferably performed as described in my co-pending applications, Ser. No. 58,161 and Ser. No. 81,841. It will be understood, however, that tissue fixed by the fixative of the present invention may be dehydrated and/or stained in accordance with any suitable method with which the art is familiar.

A Zenker's type fixative is disclosed in applicant's earlier application Serial No. 89,797, now abandoned.

Having thus described my invention, what I claim and desire to secure by Letters Patent, is:

1. A Zenker's type fixative for fixing histologic tissue, consisting essentially of potassium dichromate, mercuric chloride, and urea.

2. A dry powdered preparation for making a Zenker's type fixative solution for fixing histologic tissue, consisting essentially of from about 0.0203 to about 0.0407 mol of potassium dichromate, from about 0.0625 to about 0.1250 mol of mercuric chloride and from about 0.25 to about 0.50 mol of urea.

3. A dry powdered preparation for making a Zenker's type fixative solution for fixing histologic tissue, consisting essentially of about 17 parts of mercuric chloride, about 6 parts of potassium dichromate and about 15 parts of urea.

4. A Zenker's type fixative for fixing histologic tissue, consisting essentially of a water solution containing from about 0.0203 to about 0.0407 mol of potassium dichromate, from about 0.0625 to about 0.1250 mol of mercuric chloride and from about 0.25 to about 0.50 mol of urea.

5. A Zenker's type fixative for fixing histologic tissue consisting essentially of a water solution containing about .0407 mol of potassium dichromate, about 0.1250 mol of mercuric chloride and about 0.50 mol of urea.

ANDRES FERRARI, Jr.

REFERENCES CITED

The following references are of record in the file of this patent:

UNITED STATES PATENTS

| Number | Name | Date |
|---|---|---|
| 2,238,949 | Schlack | Apr. 2, 1941 |
| 2,437,965 | Michaels | Mar. 16, 1948 |

OTHER REFERENCES

"Standard Methods" by Wadsworth, 3rd edition, page 550, published 1947.